United States Patent
Wasylewski et al.

(10) Patent No.: US 6,561,715 B2
(45) Date of Patent: May 13, 2003

(54) INNER TIE ROD TO RELAY ROD FASTENING AND ADJUSTMENT SYSTEM

(75) Inventors: Neil A. Wasylewski, Farmington Hills, MI (US); Joseph S. Balenda, II, Flint, MI (US); Thomas E. Gansenhuber, Lapeer, MI (US); Jeffrey L. Kincaid, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/955,871

(22) Filed: Sep. 19, 2001

(65) Prior Publication Data

US 2003/0053853 A1 Mar. 20, 2003

(51) Int. Cl.$^7$ ................................. B62D 7/20
(52) U.S. Cl. .................. 403/71; 280/93.511; 403/70
(58) Field of Search .................. 403/135, 164, 403/78–80, 70–71, 52; 280/93.511, 93.51, 93.502, 93.507, 93.508

(56) References Cited

U.S. PATENT DOCUMENTS

| | | | |
|---|---|---|---|
| 1,122,953 A | 12/1914 | Lamb | |
| 1,409,007 A | 3/1922 | Johnston | |
| 1,828,891 A | * 10/1931 | Crawford et al. | 403/135 |
| 2,650,844 A | 9/1953 | Shemorry | |
| 3,008,743 A | 11/1961 | Westercamp | |
| 3,414,304 A | 12/1968 | Miller | |
| 3,650,004 A | * 3/1972 | Bergstrom | 29/402.18 |
| 3,887,211 A | * 6/1975 | Mazur | 280/86.758 |
| 4,283,091 A | 8/1981 | Enders | |
| 4,312,145 A | 1/1982 | Lukavich | |
| 4,527,924 A | * 7/1985 | Asberg | 403/135 |
| 4,798,394 A | * 1/1989 | Pollock et al. | 280/93.512 |
| 4,874,275 A | 10/1989 | Gotman | |
| 4,953,894 A | * 9/1990 | Broszat et al. | 280/86.755 |
| 5,040,917 A | 8/1991 | Camuffo | |
| 5,129,669 A | * 7/1992 | Specktor et al. | 280/86.753 |
| 5,267,625 A | * 12/1993 | Shimizu | 180/443 |
| 5,544,545 A | * 8/1996 | Sanders et al. | 74/552 |
| 5,647,606 A | * 7/1997 | Jordan | 280/86.751 |
| 5,704,726 A | * 1/1998 | Nemoto | 403/132 |
| 6,047,789 A | * 4/2000 | Iwanaga | 180/440 |
| 6,293,724 B1 | * 9/2001 | Spears et al. | 280/86.751 |
| 6,386,564 B1 | * 5/2002 | Kincad et al. | 280/93.51 |
| 6,402,168 B1 | * 6/2002 | Chino et al. | 280/86.754 |

* cited by examiner

Primary Examiner—James R. Brittain
(74) Attorney, Agent, or Firm—Harness, Dickey & Pierce P.L.C.

(57) ABSTRACT

A connection system to interconnect members of a vehicular steering linkage system has a first steering module and a second steering member adapted to receive the first steering module. A clearance exists between the first steering module and the second steering member. The first steering module includes a first steering member and a fastener. The fastener is adapted to secure the first and second steering members together.

19 Claims, 3 Drawing Sheets

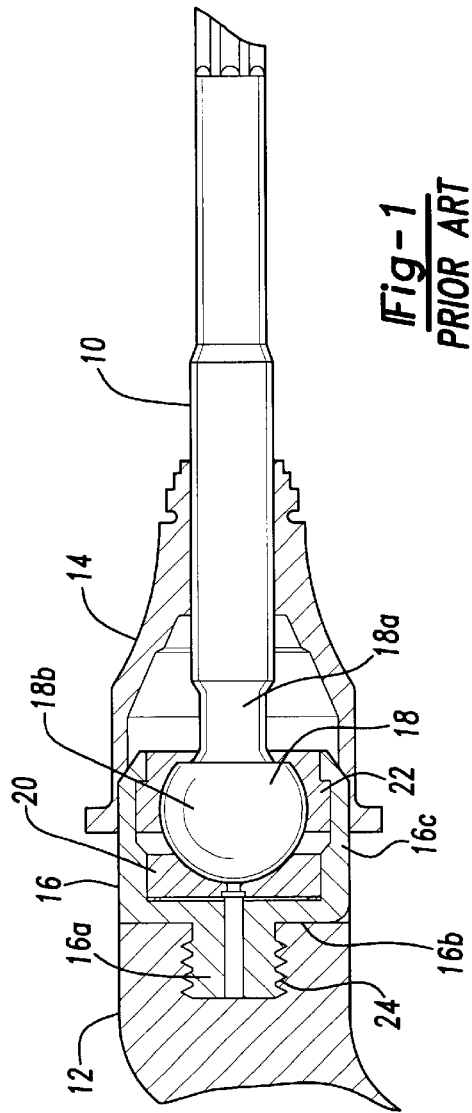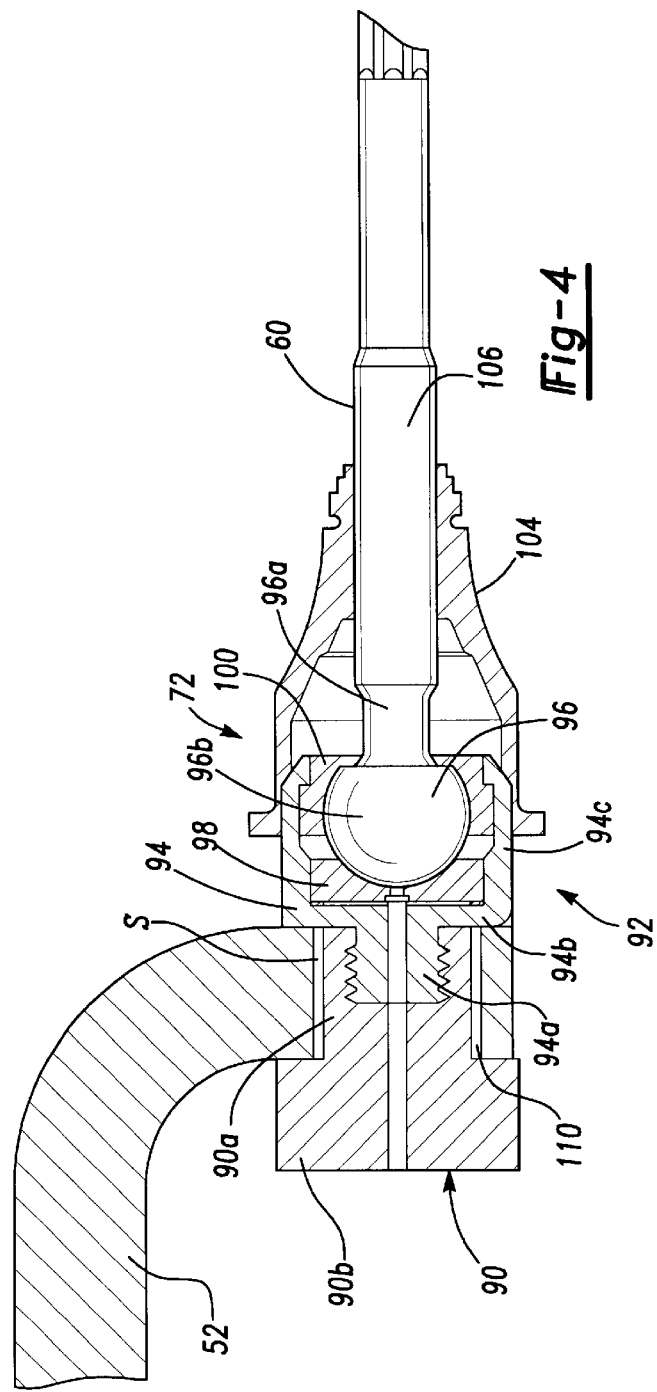

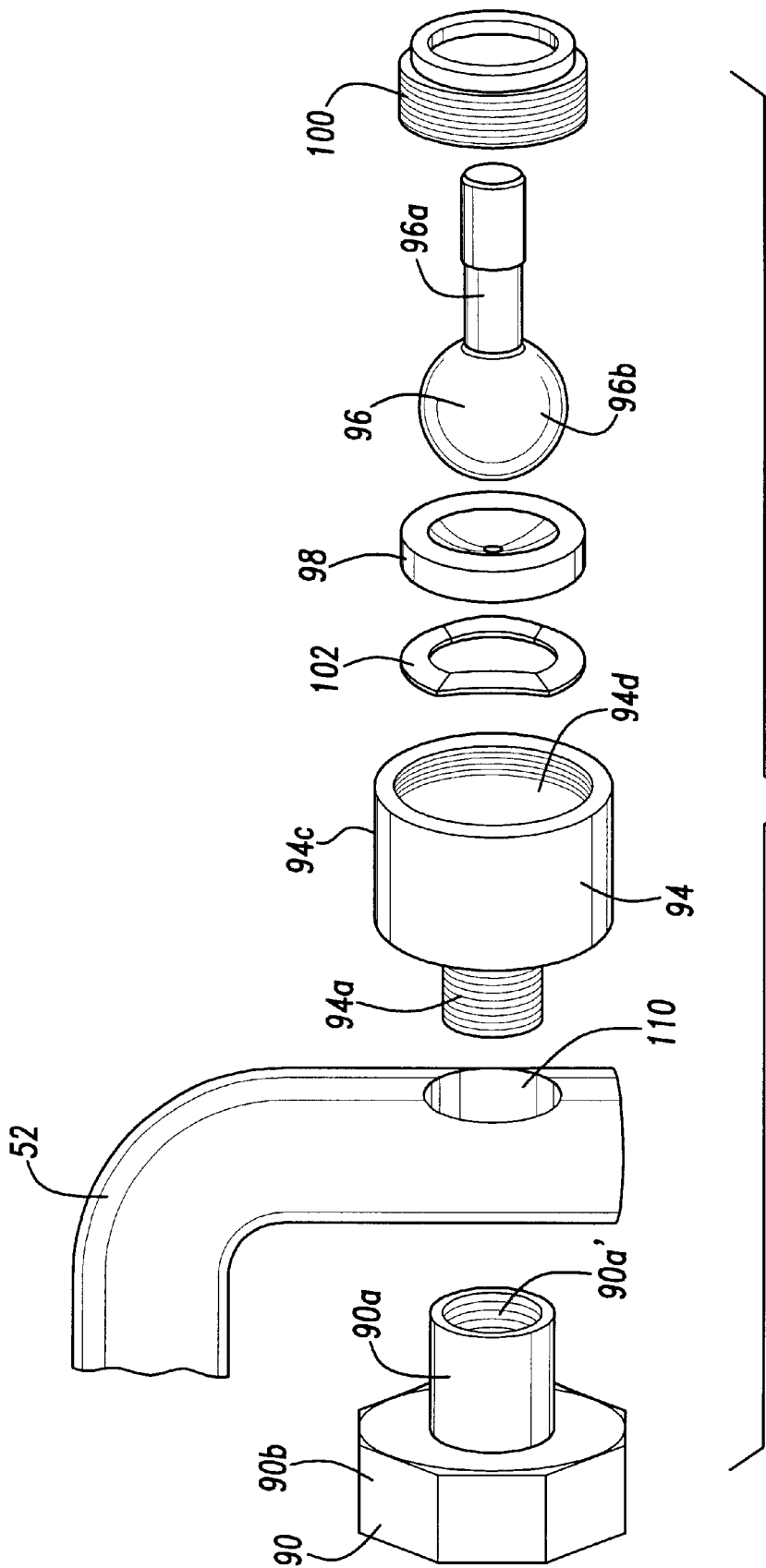

INNER TIE ROD TO RELAY ROD FASTENING AND ADJUSTMENT SYSTEM

FIELD OF THE INVENTION

The present invention relates to a steering linkage system for motor vehicles, and, more particularly, to a system for connecting a tie rod assembly to a relay rod.

BACKGROUND OF THE INVENTION

Various types of steering linkage systems are used to control the steering of an automotive vehicle. A well known type of steering linkage system has a relay rod connected to the frame or chassis of an automobile by two pivoting members, such as a pitman arm and an idler. In this type of arrangement the relay rod shifts back and forth laterally in response to steering input from the steering wheel of the automobile via a steering gear. The pivoting members are connected to the relay rod by ball and socket assemblies. The opposite end portions of the relay rod are each connected to a steering knuckle by a tie rod assembly. The tie rod assemblies are connected to the relay rod by ball and socket assemblies. The steering knuckles turn the front wheels of the automobile to steer the automobile in response to movements of the relay rod and tie rods that connect the relay rod to the steering knuckles. The steering knuckles are connected to suspension members by ball and socket assemblies. Some steering linkage systems also include a drag link for moving the relay rod.

As noted, the inner end of the tie rod is typically connected to a corresponding end of the relay rod by a ball and socket assembly. FIG. 1 shows a conventional inner tie rod to relay rod connection system. Specifically, the inner tie rod 10 is attached to a distal end of the relay rod 12 via a ball and socket assembly 14. The ball and socket assembly 14 includes a hollow cylindrical housing 16 having an upstanding threaded post 16a, a disk portion 16b and a annular wall 16c projecting generally perpendicular from disk portion 16b so as to define a socket cavity. The ball and socket assembly 14 also includes a ball stud 18 having a shank segment 18a and a ball segment 18b which is retained in the cavity between a spring seat 20 and a ball seat 22.

A spring (not shown) is inserted into a reduced diameter portion of the cavity with a belleville spring washer (not shown) positioned between a planar end face of housing disk portion 16b and a planar end face of the spring seat 20. The surface of seat 20 is adapted to engage a portion of the spherical external surface of the ball segment 18b. Prior to assembly of ball stud 18 into housing 16, shank segment 18a is passed through a bore formed through ball seat 22 such that another portion of the spherical exterior surface of ball segment 18b engages a partial spherical seat surface formed in ball seat 22 and which communicates with the bore.

To secure the ball stud 18 within housing 16, external threads are formed on ball seat 22 and are threaded into internal threads formed in the cavity of housing 16. Ball seat 22 is then tightened into housing 16 until a desired torque is reached. In addition, a blind tapped hole 24 is formed in the end of the relay rod 12. In order to fasten the tie rod to the relay rod, the upstanding threaded post 16a of the housing 16 is threaded into the blind tapped hole 24 in the end of the relay rod 12.

A disadvantage with the system just described is that there must be a minimum straight length in the relay rod 12 adjacent to the inner tie rod 10 attachment point. In addition, that straight length cannot be larger in diameter than the distance across the outer diameter of the disc portion 16b of the housing 16. These requirements are driven by the need to remove an automated tightening tool once the inner tie rod to relay rod connection has been made. Specifically, an automated wrench that is used during assembly can only be removed from the inner tie rod in one position, and thus after tightening must be slid over the relay rod in order to rotate back to its home position.

In addition, the design provides no allowance to compensate for the location of the inner tie rod ball in vehicle position.

SUMMARY OF THE INVENTION

The present invention provides a connection system for interconnecting members of a vehicular steering linkage system. The connection system includes a first steering module and a second steering member adapted to receive the first steering module. A clearance exists between the first steering module and the second steering member. The first steering module includes a first steering member and a fastener adapted to be secured thereto. The fastener is adapted to secure the first and second steering members together.

Additional features of the present invention will become apparent from the subsequent description and the appended claims, taken in conjunction with the accompanying drawings.

BRIEF DESCRIPTION OF THE DRAWINGS

FIG. 1 is a section view of an exemplary prior art tie rod to relay rod connection system;

FIG. 4 is a sectional view of a portion of the steering linkage system shown in FIG. 2 which illustrates the tie rod to relay rod connection system made in accordance with a preferred embodiment of the present invention; and FIG. 5 is a partial exploded view of the tie rod to relay rod connection system shown in FIG. 3.

DETAILED DESCRIPTION OF THE PREFERRED EMBODIMENT

In general, the present invention is directed to a connection system for interconnecting a first steering member to a second steering member in a vehicle steering linkage system. The embodiments shown are more particularly directed to a tie rod to relay rod fastening and adjustment system in a vehicle steering linkage system. The connection system of the present invention is adapted to provide improved performance without requiring modification of the other components associated with the vehicle steering linkage system. Thus, the connection system of the present invention may be utilized with a variety of steering linkage systems and is not intended to be limited to the particular application described below.

Figure 2:
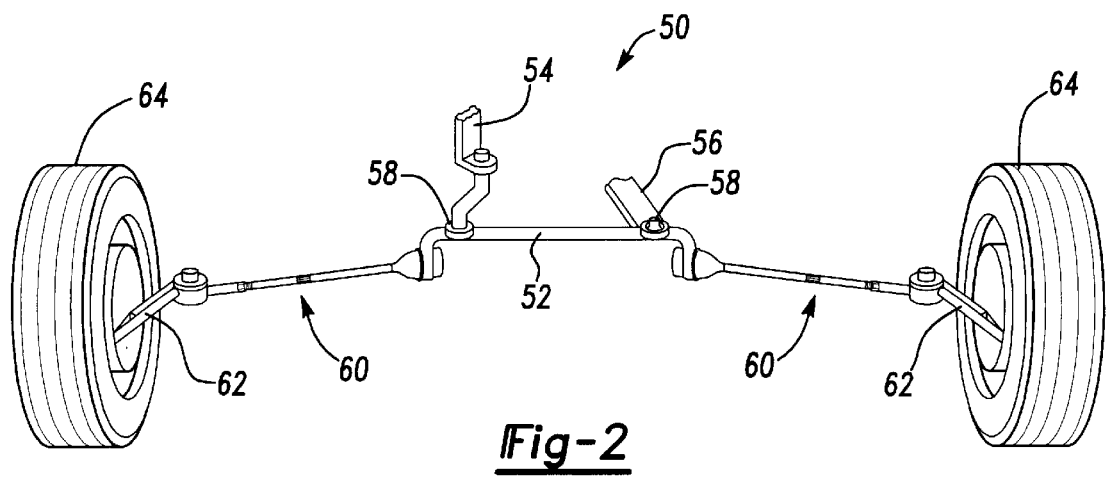
FIG. 2 is a partial schematic plan view of a vehicle having a steering linkage system constructed in accordance with the teachings of the present invention.

FIG. 2 is a partial schematic plan view of the front end of an automotive vehicle showing a steering linkage system 50. The steering linkage system 50 generally comprising a relay rod 52 that is connected to the frame or chassis (not shown) of the automotive vehicle by two pivoting members, such a pitman arm 54 and an idler arm 56. The relay rod 52, the chassis, the pitman arm 54 and the idler arm 56 are formed so that the relay rod 52 moves laterally in response to steering input from a steering wheel (not shown) which operates a steering gear (not shown) to rotate the pitman arm 54. The pitman arm 54 and idler arm 56 are connected to the relay rod 52 by ball and socket assemblies 58. Each of a pair of tie rod assemblies 60 are connected to the relay rod 52 at a first end and to an associated wheel bracket 62 at a second end. The front wheels 64 are turned in response to lateral movements of the relay rod 52 via the tie rod assemblies 60.

Figure 3:
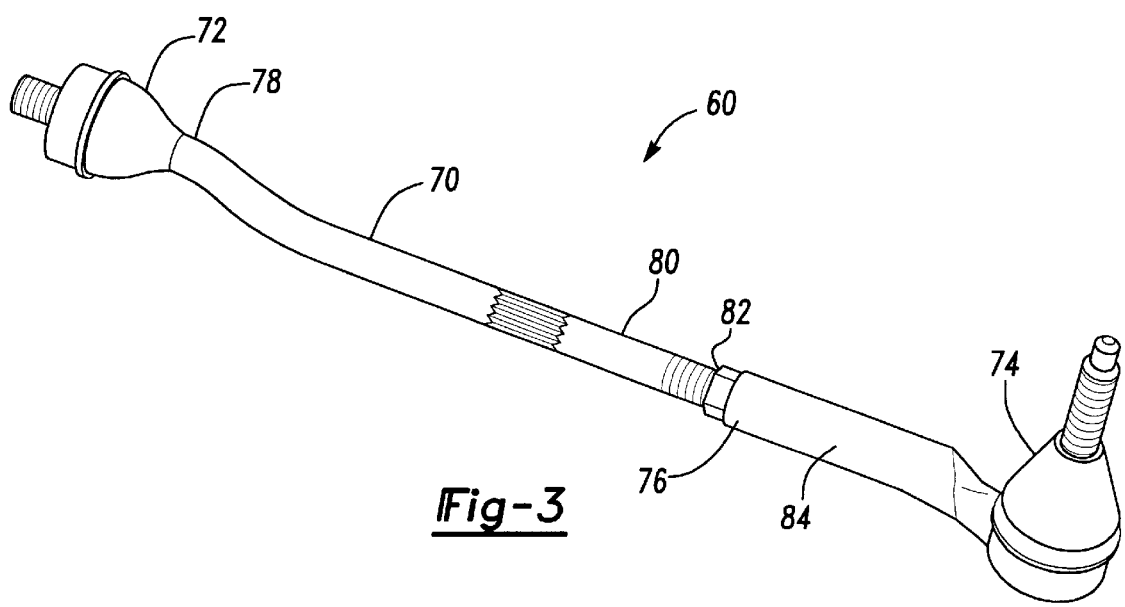
FIG. 3 is a perspective view of a portion of the steering linkage of FIG. 2 illustrating the tie rod assembly.

With particular reference to FIG. 3, the tie rod assembly 60 is illustrated to include a rod member 70, ball and socket assemblies 72 and 74, and a threaded member 76. The rod member 70 includes a first end 78 that is coupled to the ball and socket assembly 72 and second end 80 having a threaded portion 82. In the particular embodiment illustrated, rod member 70 also includes an adjustment segment 84.

With reference to FIGS. 4–5, the construction of the connection system of the present invention is illustrated in greater detail. Tie rod assembly 60 and a fastener 90 combine to form a first steering module 92. Ball and socket assembly 72 includes a hollow cylindrical housing 94 having an upstanding threaded post 94a, a disk portion 94b and an annular wall 94c projecting generally perpendicular from disk portion 94b so as to define a socket cavity 94d. Ball and socket assembly 72 also includes a ball stud 96 having a shank segment 96a and a ball segment 96b which is retained in cavity 94d between a spring seat 98 and a ball seat 100. Spring seat 98 is shown inserted into a reduced diameter portion of cavity 94d with a belleville spring washer 102 positioned between a planar end face of housing disk portion 94b and planar end face of spring seat 98.

A partial spherical seat surface extends inwardly from the opposite planar end face of spring 102 when assembled. Seat surface is adapted to engage a portion of the spherical external surface of ball segment 96b. Prior to assembling a ball stud 96 into housing 94, its shank segment 96a is passed through a bore formed through ball seat 100 such that another portion of the spherical exterior surface of ball segment 96b engages a partial spherical seat surface formed in ball seat 100 and which communicates with the bore. External threads are formed on ball seat 100 and are threaded into internal threads formed in cavity 94d of housing 94 to secure ball stud 96 within housing 94.

Ball seat 100 is tightened into housing 94 until a desired torque is reached. Thereafter, a distal end of ball seat 100 is inwardly swaged or crimped to create an inward lip flange to prevent ball seat 100 from unthreading itself during use. As an alternative, a welded joint may be used in place of the flange. As a further alternative, ball seat 100 need not be threaded to housing 94 but instead may be retained therein simply by crimping of the distal end to create a lip flange.

A flexible seal 104 is also provided which is attached around the inner tie rod housing 94 and an inner tie rod shank segment 106 using a clamp ring or other suitable fastening means. The seal 104 prevents water and contaminants from entering the ball and socket assembly and hindering smooth operation thereof.

As noted, the relay rod 52 is adapted to connect with the inner tie rod 60. To this end, a bore 110 is formed in a portion of the relay rod 52. A mating segment of the fastener 90 is inserted through the bore 110 in the relay rod 52. For exemplary purposes, the mating segment of the fastener 90 illustrated is shown to include a shank portion 90a extending from a head portion 90b. The shank portion 90a is adapted to insert into the bore 110. The shank portion 90a includes a shank cavity 90a' having female threads. The upstanding threaded post 94a of the inner tie rod housing 94 has male threads adapted to mate with the female threads of the shank cavity 90a'. Accordingly, the fastener 90 is threaded onto the upstanding threaded post 94a and tightened to a suitable torque level. In this manner, the connection between the inner tie rod 60 and the relay rod 52 is made. One skilled in the art will understand that the fastener 90 may be of a type other than the hexagonal flange nut shown. One skilled in the art will also recognize that the connection system is not limited to the interconnection of a tie rod and a relay rod, but may also be applicable to other steering linkage members, such as connecting a pitman arm or idler arm to the relay rod or connecting a wheel bracket to the tie rod.

It should be noted that a clearance S is provided between the outer diameter of the shank 90a and the diameter of the bore 110 of the relay rod 52. This clearance allows the inner tie rod housing 94 position to vary relative to the vehicle directions. As such, precise adjustment of the inner tie rod ball position can be made, thereby compensating for possible variations in other steering or vehicle frame structures.

It should also be noted that the inner tie rod to relay rod connection system of the present invention provides several advantages over conventional systems. For example, the present invention simplifies the machining of the relay rod, since only a bore needs to be formed in each end of the rod. In contrast, the conventional system shown in FIG. 1 requires the machining of a blind tapped hole in each end of the relay rod, thereby adding to the cost and complexity of manufacture.

Similarly, the present invention reduces dependence on forging and machining tolerances and provides a potential for reduced scrap. Currently, if one of the tapped holes in the relay rod is incorrectly processed, the entire relay rod is scrapped. However, if there is a processing or tolerance problem with the present invention, only one less expensive fastener would be scrapped.

Also, unlike the conventional system of FIG. 1, the present invention does not require a minimum straight length in the relay rod adjacent to the inner tie rod attachment point. This is advantageous since the assembly of the present invention requires less complicated assembly equipment. For example, the use of a more traditional socket type torque gun is possible rather than elaborate gear driven crowfoot designs which are currently used. Another advantage of the present invention is that compressive stresses to relay rod are applied, thereby improving the fatigue life of that portion of the relay rod. Also, the present invention provides improved clamp load due to longer bolt stretch.

While the invention has been described in the specification and illustrated in the drawings with reference to a preferred embodiment, it will be understood by those skilled in the art that various changes may be made and equivalence may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within this description of the appended claims.

What is claimed is:

1. A vehicle steering system comprising:
   a first steering member having a mounting aperture, the first steering member adapted for movement in response to movement of a steering wheel;

a second steering member having a housing and a rod with a ball, the ball being at least partially disposed within the housing, the housing being in abutment with a first side of the first steering member; and a coupling device for engaging the housing, the coupling device being in abutment with a second side of the first steering member;

wherein at least one of the coupling device and the housing extends into the mounting aperture;

wherein the coupling device engages the housing and the first steering member to fix the housing to the first steering member; and wherein the mounting aperture, the housing and the second steering member are aligned axially with one another.

2. The vehicle steering system of claim 1, wherein a portion of the at least one of the coupling device and the housing that extends into the mounting aperture is sized smaller than the mounting aperture to permit a position of the second steering member to be adjusted relative to the first steering member before the coupling device fixes the housing to the first steering member.

3. The vehicle steering system of claim 2, wherein the mounting aperture is a slot.

4. The vehicle steering system of claim 2, wherein the mounting aperture is circular in shape.

5. The vehicle steering system of claim 1, wherein the coupling device includes a threaded portion for threadably engaging the housing.

6. The vehicle steering system of claim 5, wherein the threaded portion is internally threaded.

7. The vehicle steering system of claim 1, wherein the first steering member includes an L-shaped end having a generally upstanding portion into which the mounting aperture is formed.

8. The vehicle steering system of claim 1, wherein the coupling device includes a necked-down portion that is sized to extend into the mounting aperture.

9. The vehicle steering system of claim 8, wherein the necked-down portion does not extend to the first side of the first steering member when the coupling device is in abutment with the second side of the first steering member.

10. The vehicle steering system of claim 1, wherein the first steering member is a relay rod assembly and the second steering member is a tie rod assembly.

11. The vehicle steering system of claim 1, wherein the coupling device is a one-piece structure.

12. The vehicle steering system of claim 11, wherein the one-piece structure is selected from a group consisting of nuts, screws and bolts.

13. A method for assembling a steering system, the method comprising the steps of:

providing a relay rod assembly having a mounting aperture;

providing a tie rod assembly having a mounting end;

providing a coupling device that is configured to threadably engage the mounting end;

placing a portion of at least one of the coupling device and the tie rod assembly into the mounting aperture;

threadably engaging the coupling device and the mounting end;

providing a tool or rotating an end of the coupling device opposite a portion of the coupling device that is threadably engaged to the mounting end;

sliding the tool onto the end of the coupling device in a direction that is parallel to an axis about which the coupling device and the mounting end are threadably engaged; and rotating the end of the coupling device to fix the relay rod assembly and tie rod assembly relative to one another.

14. The method of claim 13, wherein the coupling device is a one-piece structure.

15. The method of claim 14, wherein the one-piece structure is selected from a group consisting of nuts, screws and bolts.

16. The method of claim 13, wherein the tool is selected from a group consisting of sockets, allen drivers, square drivers and lobed drivers.

17. A vehicle steering system comprising:

a relay rod assembly having a mounting aperture formed in a generally upstanding end portion thereof;

a tie rod assembly having a threaded mounting end; and a coupling device having a threaded end portion that is configured to threadably engage the threaded mounting end;

wherein at least one of the threaded end portion and the threaded mounting end extends into the mounting aperture; and wherein the threaded end portion and the threaded mounting end are engaged to one another to produce a clamping force that fixes the relay rod assembly and the tie rod assembly to one another;

wherein the tie rod assembly is axially aligned to the threaded mounting end.

18. The vehicle steering system of claim 17, wherein the mounting aperture is sized larger than a portion of the at least one of the threaded end portion and the threaded end mounting end to permit a position of the tie rod assembly to be adjusted relative to the relay rod assembly before the clamping force fixes the tie rod assembly and the relay rod assembly together.

19. The vehicle steering system of claim 18, wherein the mounting aperture has a slotted or circular shape and the threaded end portion is internally threaded.

* * * * *